US009574257B2

(12) United States Patent
Allenou et al.

(10) Patent No.: US 9,574,257 B2
(45) Date of Patent: *Feb. 21, 2017

(54) POWDER OF AN ALLOY BASED ON URANIUM AND ON MOLYBDENUM USEFUL FOR MANUFACTURING NUCLEAR FUELS AND TARGETS INTENDED FOR PRODUCING RADIOISOTOPES

(75) Inventors: Jerome Allenou, Lille (FR); Francois Charollais, Villelaure (FR); Meryl Brothier, Aix en Provence (FR); Xaviere Iltis, Pierrevert (FR); Olivier Tougait, Rennes (FR); Mathieu Pasturel, Montreuil sur Ille (FR); Henri Noel, Thorigne Fouillard (FR)

(73) Assignees: COMMISSARIAT A L'ENERGIE ATOMIQUE ET AUX ENERGIES ALTERNATIVES, Paris (FR); UNIVERSITE DE RENNES 1, Rennes (FR)

( * ) Notice: Subject to any disclaimer, the term of this patent is extended or adjusted under 35 U.S.C. 154(b) by 666 days.

This patent is subject to a terminal disclaimer.

(21) Appl. No.: 13/977,201

(22) PCT Filed: Dec. 23, 2011

(86) PCT No.: PCT/EP2011/073999
§ 371 (c)(1),
(2), (4) Date: Sep. 5, 2013

(87) PCT Pub. No.: WO2012/089684
PCT Pub. Date: Jul. 5, 2012

(65) Prior Publication Data
US 2013/0336833 A1 Dec. 19, 2013

(30) Foreign Application Priority Data
Dec. 28, 2010 (FR) ...................................... 10 61319

(51) Int. Cl.
C22C 43/00 (2006.01)
B22F 9/20 (2006.01)
(Continued)

(52) U.S. Cl.
CPC ............. *C22C 43/00* (2013.01); *B22F 1/0055* (2013.01); *B22F 9/20* (2013.01); *C22C 1/04* (2013.01);
(Continued)

(58) Field of Classification Search
None
See application file for complete search history.

(56) References Cited

U.S. PATENT DOCUMENTS 3,102,848 A   9/1963 Merlub-Sobel
3,109,730 A   11/1963 Zegler
(Continued)

FOREIGN PATENT DOCUMENTS

DE    1433120 A1   5/1969
FR    2777688 A1   10/1999
(Continued)

OTHER PUBLICATIONS

Apr. 6, 2015 Office Action in U.S. Appl. No. 13/977,259, issued by George Wyszomierski.
(Continued)

*Primary Examiner* — George Wyszomierski
(74) *Attorney, Agent, or Firm* — Hultquist, PLLC; Mary B. Grant

(57) ABSTRACT

The invention relates to a powder of an alloy based on uranium and molybdenum in a metastable γ phase, which is formed of particles which have an elongation index at least equal to 1.1, a non-zero closed porosity value and which are composed of grains having a molybdenum content, for which the variations within the same grain are of at most 1%

(Continued)

by mass. It also relates to a method allowing preparation of this alloy powder as well as to the use of said powder for manufacturing nuclear fuels and targets for producing radioisotopes. Applications: Manufacturing of nuclear fuels, notably for experiment nuclear reactors; manufacturing of targets for producing radioisotopes, notably for the medical industry.

22 Claims, 4 Drawing Sheets

(51) Int. Cl.
    *G21C 3/60*     (2006.01)
    *B22F 1/00*     (2006.01)
    *C22C 1/04*     (2006.01)

(52) U.S. Cl.
    CPC ............. *G21C 3/60* (2013.01); *B22F 2998/10* (2013.01); *Y02E 30/38* (2013.01)

(56) References Cited

U.S. PATENT DOCUMENTS

| | | |
|---|---|---|
| 3,778,380 A | 12/1973 | Baker et al. |
| 4,584,184 A | 4/1986 | Nalewajek et al. |
| 5,978,432 A | 11/1999 | Kim et al. |
| 7,430,267 B2 * | 9/2008 | Seo .......................... G21C 3/20 376/412 |
| 9,190,180 B2 * | 11/2015 | Allenou .................... B22F 9/20 |
| 2007/0036261 A1 * | 2/2007 | Kim .......................... G21C 3/02 376/409 |
| 2013/0333519 A1 | 12/2013 | Allenou et al. |

FOREIGN PATENT DOCUMENTS

| | | |
|---|---|---|
| FR | 2889351 A1 | 2/2007 |
| GB | 2330448 A | 4/1999 |
| GB | 2354256 A | 3/2001 |
| JP | 55-54508 A | 4/1980 |
| JP | 6-258477 A | 9/1994 |

OTHER PUBLICATIONS

Chen, M., et al., "Characterization of gamma-U-10 wt.percentMo alloy powders obtained by hydride-milling-dehydride process", "Journal of Nuclear Materials", May 1, 2010, pp. 69-72, vol. 400, No. 1.
Lee, J., et al., "Study of decomposition and reactions with aluminum matrix of dispersed atomized U-10 wtpercent Mo alloy", "Journal of Nuclear Materials", 2002, pp. 147-152, vol. 305.
Park, J., et al., "Neutron diffraction analyses of U-(6-10 wt.percent)Mo alloy powders fabricated by centrifugal atomization", "Journal of Nuclear Materials", Feb. 2010, pp. 27-30, vol. 397.

* cited by examiner

POWDER OF AN ALLOY BASED ON URANIUM AND ON MOLYBDENUM USEFUL FOR MANUFACTURING NUCLEAR FUELS AND TARGETS INTENDED FOR PRODUCING RADIOISOTOPES

CROSS-REFERENCE TO RELATED APPLICATIONS

This application is a U.S. national phase under the provisions of 35 U.S.C. §371 of International Patent Application No. PCT/EP11/73999 filed Dec. 23, 2011, which in turn claims priority of French Patent Application No. 1061319 filed Dec. 28, 2010. The disclosures of such international patent application and French priority patent application are hereby incorporated herein by reference in their respective entireties, for all purposes.

TECHNICAL FIELD

The present invention relates to a method for preparing a powder of an alloy based on uranium and molybdenum in a metastable γ phase and, in particular, of a binary alloy UMo or of a ternary alloy UMoX wherein X represents a metal other than uranium and molybdenum.

It also relates to a method for preparing this alloy powder as well as to the uses of this powder.

Such an alloy powder is actually able to enter the manufacturing of nuclear fuels and, notably fuels for experimental nuclear reactors, more known under the letters MTR (<<Material Testing Reactor>>), such as the Jules Horowitz Reactor (JHR) of the CEA in Cadarache, the High Flux Reactor (HFR) of the Laue-Langevin Institute or further the high neutron flux reactor BR-2 of the site of Mol in Belgium.

It may also enter the structure of targets for producing radioisotopes, notably for the medical industry.

PRIOR ART

Up to the 1950ies, fuels dedicated to MTRs essentially consisted of alloys of uranium and aluminium having a uranium 235 mass content of 93% for a specific load of 1.2 g or uranium per $cm^3$.

From 1977 and driven by the United States of America, a program aiming at reducing the risks of proliferation of nuclear weapons and, therefore at lowering the uranium enrichment level of the fuels dedicated to MTRs was set into place on an international level. This is the RERTR (<<Reduced Enrichment for Research and Test Reactor>>) program.

Consequently, the development of new uranium alloys which are capable of being used as nuclear fuels in MTRs while having a uranium 235 mass content not exceeding 20%, gave rise to many studies.

Thus, alloys based on uranium and silicon and alloys based on uranium and molybdenum were notably studied. The latter type of alloy is the one which has the most interesting properties since it gives notably the possibility of attaining a specific load of 8.5 g of uranium per $cm^3$ of a fuel core while this load is only at best of 4.8 g of uranium per $cm^3$ for uranium silicides.

To this day, three types of powders of alloys of uranium and molybdenum in a metastable γ phase have been proposed, i.e.: powders obtained by <<melt-atomization>>, powders obtained by <<melt-mechanical fragmentation>> and powders obtained by <<melt-chemical fragmentation>>.

The powders obtained by <<melt-atomization>>, the preparation of which is notably described in French patent No. 2 777 688 [1], U.S. Pat. No. 5,978,432 [2] and Japanese patent application No. 55-054508 [3], consist of particles which are spherical or quasi-spherical on the one hand (i.e. the ratio between their maximum dimension ($D_{max}$) and their minimum dimension ($D_{min}$) is less than 1.1), and without any intraparticulate porosity on the other hand (except for a manufacturing defect).

Now, it is not desirable that the particles of a powder of a uranium and molybdenum alloy, which is intended to enter the structure of nuclear fuels, be spherical or quasi-spherical since this may induce segregation of fissile particles during the rolling to which the fuel elements are subject during their manufacturing, just as it is not desirable that these particles be without any porosity, such a porosity actually being necessary for ensuring the presence in the fuels of buffer tanks for fission gases, able to increase the capability of these fuels of retaining these gases in an irradiation situation and, accordingly delay the occurrence of swelling of said fuels.

Furthermore, the particles of these powders consist of grains for which the molybdenum content differs from the center to the periphery of these grains (J. S. Lee et al., *Journal of Nuclear Materials*, 306, 147-152, 2002 [4]), and are covered with a thin layer of oxide for which adhesion is low. (J. M. Park et al., *Journal of Nuclear Materials*, 397, 27-30, 2010 [5]).

The powders obtained by <<melt-mechanical fragmentation>> consist of particles for which the shape and dimensions are not defined and not under control and which are, like the particles of the previous powders, without any intraparticulate porosity (except for, there again, any manufacturing defect). These particles further have a granular microstructure with a strong work-hardening rate. Now, such a microstructure is a priori unstable and which may strongly evolve in an irradiation situation.

As for the powders obtained by <<melt-chemical fragmentation>>, they also consist of particles for which the shape and dimensions are not defined and not under control and which are also without any intragranular porosity. Further, these powders can only be powders of binary alloys UMo, i.e. strictly consisting of uranium and molybdenum, since the methods by <<melt-chemical fragmentation>> do not give the possibility of obtaining powders of ternary alloys UMoX wherein the element X is homogeneously distributed.

Taking into account the foregoing, the inventors therefore set their goal of providing a powder of an alloy based on uranium and molybdenum in a metastable γ phase which is generally free of all the drawbacks exhibited by powders of alloys based on uranium and molybdenum proposed to this day.

More particularly, the inventors set their goal of providing a powder of an alloy based on uranium and molybdenum in a metastable γ phase for which the particles have characteristics, notably of shape, of intragranular porosity and of molybdenum distribution homogeneity, capable of facilitating the manufacturing of nuclear fuels from this powder and of optimizing the behavior of these fuels in an irradiation situation and, in particular, their capability of retaining the fission gases.

They also set the goal that this alloy powder may both be a powder of a ternary alloy UMoX, or even of an alloy consisting of a number of metals of more than 3, and a powder of a binary alloy UMo.

Further they set the goal that this alloy powder may be manufactured by a method which is relatively simple to apply and has a cost compatible with utilization on an industrial scale.

SUMMARY OF THE INVENTION

These objects and further other ones are achieved by the present invention which firstly proposes a powder of an alloy comprising uranium and molybdenum in a metastable γ phase, which powder is formed of particles which have an elongation index at least equal to 1.1, a non-zero value of closed porosity and which are composed of grains having a molybdenum content for which the variations within a same grain are at most of 1% by mass.

In the foregoing and in the following, by <<elongation index>> of a particle, also called elongation parameter, is meant the ratio of the maximum Féret diameter to the minimum Féret diameter of this particle.

In this respect, it is recalled that the maximum Féret diameter, noted as $D_{Fmax}$, of a particle corresponds to the distance existing between two tangents parallel to opposite sides of this particle while the minimum Féret diameter, noted as $D_{Fmin}$, of a particle therefore corresponds to the minimum distance existing between two tangents parallel to opposite sides of this particle.

The maximum and minimum Féret diameters and therefore the elongation index of the particles of the alloy powder according to the invention may notably be determined from electron and optical microscopy images according to the methodology described by C. Souchier in <<Analyse d'images>>, (Image Analysis), in Techniques de l'Ingénieur, Traité Analyse Chimique et Caractérisation, P855, 1-18, 1998 [6].

Moreover, by <<closed porosity>> of a particle, also called occluded porosity, is meant the whole of the pores which this particle comprises and which are occluded in the alloy forming the particle, i.e. they do not open out at the surface of the particle.

The value of the closed porosity of the particles of the alloy powder according to the invention may notably be determined from pictures obtained by scanning electron microscopy, of polished sections, according to the ASTM E1245-03 standard.

As for the variations of the molybdenum content (or that of any other metal element) within a grain, they may notably be determined by submitting this grain to a scanning electron microscopy analysis coupled with an energy dispersion spectrometry analysis.

According to the invention, the elongation index of the particles of the alloy powder is preferably at most equal to 2, the inventors having actually noticed that an elongation comprised between 1.1 and 2 gives the possibility of giving fuels, which are manufactured in the form of plates from this alloy powder, a significant interparticulate porosity, of the order of 3 to 10% (v/v) and this without however affecting the behavior upon rolling the alloy powder.

Now, such an interparticulate porosity is extremely interesting since it will, like the intraparticulate porosity (i.e. the closed porosity of the particles), ensure the role of buffer reservoirs for the fission gases in an irradiation situation and will thus increase the retention capacity of the fuels for fission gases.

According to the invention, the value of the closed porosity of the particles of the alloy powder is preferentially at most equal to 5% (v/v) and this porosity advantageously consists of closed pores for which the size is at most equal to 3 μm.

In the foregoing and in the following, by <<size>> of a closed pore is meant the equivalent diameter of this pore as determined from electron or optical microscopy pictures following the methodology described in the aforementioned reference [6].

Preferably, the alloy powder is composed of particles, the dimensions of which (as determined by laser diffraction) range from 20 to 100 μm.

According to the invention, the alloy powder is preferably:

a powder of a binary alloy UMo, i.e. of an alloy only consisting of uranium and molybdenum, in which case molybdenum preferentially represents from 5 to 15% by mass and, even better, from 7 to 10% by mass of this alloy; or a powder of a ternary alloy UMoX in which X represents a metal different from uranium and molybdenum, capable of further improving the behavior of a nuclear fuel under irradiation, in which case molybdenum preferentially represents from 5 to 15% by mass and, even better, from 7 to 10% by mass of this alloy while X, which may notably be titanium, zirconium, chromium, silicon, niobium, platinum, tin, bismuth, ruthenium or palladium, typically represents at most 6% by mass of the alloy and, even better, at most 4% by mass of said alloy.

The alloy powder according to the invention may notably be prepared by a method which comprises:

a) putting at least one first reagent selected from uranium oxides and mixtures thereof, uranium fluorides and mixtures thereof, into contact with a second reagent consisting in molybdenum and a third reagent consisting in a reducing metal, the first, second and third reagents being in a divided form;

b) reacting the so contacted reagents at a temperature at least equal to the melting temperature of the third reagent and under an inert atmosphere, whereby this reaction leads to the formation of the alloy comprising uranium and molybdenum, in the form of a powder, the particles of which are covered with a layer of an oxide or fluoride of the reducing metal;

c) cooling the so formed powder at a rate at least equal to 450° C./hour; and d) removing the layer of reducing metal oxide or fluoride which covers the particles of the powder of the alloy comprising uranium and molybdenum.

Consequently, an object of the invention is also a method as defined above.

In this method, the first reagent is preferably a uranium oxide in which the oxidation number of the uranium ranges from 4 to 6, i.e. uranium dioxide ($UO_2$), uranium trioxide ($UO_3$), uranium sesquioxide ($U_3O_8$), uranium tetraoxide ($U_4O_9$) or a mixture thereof, which is used in the form of a powder.

However, it may also be a uranium fluoride such as uranium tetrafluoride or a mixture of uranium fluorides, also being in the form of a powder.

Being aware that the dimensions of the particles of the first reagent have an impact on the grain size of the alloy of the powder which is formed in step b) and that it is preferred that the particles of this alloy powder have dimensions (as determined by laser diffraction) ranging from 20 to 100 μm, a uranium oxide powder is preferably used, the particles of which have dimensions (as determined by laser diffraction) ranging from 1 to 100 μm and, even better, from 5 to 50 μm.

To do this, the uranium oxide powder may be subject, prior to its use, to one or several siftings giving the possibility of removing particles of too small or too large dimensions.

Moreover, the uranium oxide powder may also be subject, prior to its use, to a treatment of the ovening type, intended to rid it from possible chemical species (water, oxyhydrates, . . . ) which may found at the surface of the particles of this powder and/or to a heat treatment such at a temperature of 600 to 1,000° C., under a reducing atmosphere such as an atmosphere consisting of a mixture of argon and hydrogen, in order to bring back the oxygen content of this powder to stoichiometry with respect to uranium.

More preferably, the first reagent is a powder of uranium dioxide, for which the uranium 235 content preferably represents from 1 to 20 atomic % of the total content of uranium of this powder, which has optionally been treated beforehand so that its stoichiometric ratio O/U is equal to 2 or substantially equal to 2.

The second reagent, i.e. the molybdenum, is also preferably used in the form of a powder.

There again, insofar that the dimensions of the particles of this powder have an impact on the grain size of the alloy powder which is formed in step b), the molybdenum powder is preferably formed of particles, the dimensions of which (as determined by laser diffraction) are at most equal to 250 μm and, even better, range from 5 to 150 μm.

As for the third reagent, i.e. the reducing metal, it is advantageously selected from alkaline metals (lithium, sodium, potassium, rubidium, cesium and francium) and earth alkaline metals (beryllium, calcium, magnesium, strontium, barium and radium).

More specifically, it is preferred that the third reagent be an earth alkaline metal and notably magnesium or calcium, which is used either in the form of a powder or in the form of shavings or turnings.

According to the invention, step a) may be carried out by proceeding with simple mixing of the first, second and third reagents and by then introducing this mixture into the reaction enclosure in which it is intended to carry out step b). In which case, the mixing of the three reagents is preferably carried out in a mixer of powders of the Turbula™ type, allowing intimate mixing of powders of different density and grain size without inducing agglomeration of the particles forming these powders and accordingly a modification of their grain size.

Alternatively, step a) may also be carried out by depositing in the reaction enclosure at least one layer of pellets consisting of a homogeneous mixture of the first and second reagents (which will have been prepared beforehand, for example by mixing both of these reagents in a powder mixer of the Turbula™ type, and then by submitting the resulting mixture to uniaxial compression) and at least two layers of the third reagent, the layer of pellets being inserted between both layers of the third reagent.

In every case, the first, the second and third reagents are preferably put into contact in proportions with which it is possible to obtain at the end of step b), a powder of an alloy having a molybdenum content compliant with the desired one but in which there is no longer any uranium present in the form of an oxide or fluoride.

Thus, for example, in the case when the first reagent is uranium dioxide while the third reagent is magnesium, the reaction which occurs in step b) may be written down according to the following simplified scheme:

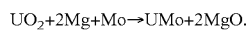

In order to obtain a powder of an alloy having a 10% molybdenum mass content, 1.22 g of uranium dioxide and 0.12 g of molybdenum will therefore be used and an amount of magnesium at least equivalent to the theoretical amount of magnesium which is required for reducing the totality of the uranium dioxide (i.e., in the case of the reaction mentioned above, 2 moles of magnesium for 1 mole of uranium dioxide).

In order to have a safety margin and to ensure total reduction of the uranium dioxide, it is possible to use an excess of magnesium at most corresponding to twice the theoretical amount of the required magnesium. In the previous example, the mass of magnesium which may be used is then 0.4391 g of magnesium.

According to the invention, step b) is preferably carried out in a reaction enclosure in molybdenum in order to avoid that the alloy powder which is desirably prepared, be contaminated with elements, notably metal elements, stemming from the material of this enclosure.

As indicated earlier, step b) is carried out at a temperature equal to or greater than the melting temperature of the third reagent, which means that this temperature will for example be of at least 650° C. if the third reagent is magnesium and of at least 842° C. if the third reagent is calcium.

In fact, within the scope of the invention, it is preferred that step b) be carried out at a temperature equal to or greater than 900° C. while being less than the melting temperature of the alloy comprising the uranium and molybdenum.

Typically, the temperature used in step b) ranges from 950 to 1,150° C., an ideal temperature for example being 1,100° C.

Moreover, it is preferred that this temperature be gradually attained. Also, step b) comprises a rise in temperature, advantageously from 50 to 200° C./hour.

Further it is preferred that step b) be carried out under a pressure of at most 1 bar of an inert gas or of a mixture of inert gases such as for example argon or a mixture of nitrogen and argon.

The duration of step b) depends on the temperature used in this step and on the rate at which this temperature is attained. Thus, for example, for an equivalent rise in temperature, 48 hours will be required for a reaction carried out at 950° C. while 24 hours will be sufficient for a reaction carried out at 1,100° C.

As indicated earlier, step c), which is intended to set the alloy in a metastable γ phase, is carried out by using a cooling rate equal to or greater than 450° C./hour.

To do this, the reaction enclosure is preferably cooled by immersion in a heat transfer fluid, for example in a water bath or in an oil bath of the silicon oil type, maintained at room temperature or at a temperature below the latter.

As for step d), it is for example carried out by dissolving the layer of reducing metal oxide or fluoride which covers the particles of the alloy powder (as well as the excess of reducing metal if the latter has been used with excess), for example by treating the alloy powder with an acid aqueous phase such as an aqueous solution of hydrochloric acid, or with an organic phase comprising one or several solvents including hydrogenated groups.

It should be noted that, in order to prepare a powder of a ternary alloy UMoX, or even of an alloy consisting of more than three metals, by the method which has just been described, it is sufficient to add the metal X and, if necessary the other additional metal(s), in a divided form, to the reagents used during step a), this addition may notably be accomplished by using this(these) metal(s) in a form in which it(they) is(are) already alloyed with molybdenum.

Taking into account the characteristics exhibited by the particles of the alloy powder according to the invention, this powder has the nature of very significantly facilitating the manufacturing of nuclear fuels, notably by minimizing the risks of destabilization of the alloy and of segregation during the manufacturing of these fuels, and of optimizing the behavior of fuels in an irradiation situation, notably by increasing their capacity of retaining the fission gases, which will give the possibility of delaying their swelling.

Consequently, an object of the invention is further the use of a powder of an alloy comprising uranium and molybdenum in a metastable γ phase as defined earlier, for manufacturing a nuclear fuel and, in particular, a fuel intended for MTRs.

Typically, within the scope of this manufacturing and as well known in the state of the art, the powder of the alloy comprising uranium and molybdenum in a metastable γ phase is mixed with an powder of aluminum or of an aluminum-based alloy for forming the combustible core and this mixture is then subject to rolling which both allows its shaping into plates and its cladding.

An object of the invention is still the use of a powder of an alloy comprising uranium and molybdenum in a metastable γ phase as defined earlier, for the manufacturing of targets intended for producing radioisotopes.

Other features and advantages of the invention will become apparent from the additional description which follows, which relates to examples for preparing powders of a binary alloy UMo and of a ternary alloy UMoTi according to the invention and to which refer the appended Figures.

It is obvious that these examples are only given as illustrations of the object of the invention and they by no means form a limitation of this object.

SHORT DESCRIPTION OF THE DRAWINGS

DETAILED SUMMARY OF PARTICULAR EMBODIMENTS

Example 1

Preparation of a Powder of a Binary Alloy UMo According to the Invention 100 g of a powder of a binary alloy UMo with 10% by mass of molybdenum is prepared in the following way.

First of all, pellets measuring 12 mm in diameter and with a thickness of 2 mm, of a homogeneous mixture U/Mo are manufactured.

To do this, 102.1 g of a UO$_2$ powder (O/U ~2), the particles of which have dimensions (as determined by laser diffraction) ranging from 1 to 50 µm, are mixed with 10 g of molybdenum powder, the particles of which (as measured by laser diffraction) have dimensions ranging from 1 to 150 µm, in a Turbula™ mixer for 20 minutes and at a rate of 45 cycles/minute. This mixture is then subject to uniaxial compression by applying a stress of 100 MPa.

After which, layers of UO$_2$/Mo pellets and layers of magnesium shavings for which the largest dimension ranges from 1 to 3 mm, are deposited in a molybdenum crucible, so as to form a stack in which each layer of UO$_2$/Mo pellets is inserted between two layers of magnesium shavings.

This crucible is hermetically sealed under a slight pressure, of less than 1 bar, of argon. Next, it is placed in an oven which is heated at a rate of 150° C./hour until it attains the temperature of 1,100° C. The crucible is then left in the oven at this temperature so that the dwelling time of the crucible in the oven is a total of 24 hours.

At the end of this treatment, the crucible is cooled down at a rate of 1,000° C./hour by immersing it in a water bath at room temperature.

The powder contained in the crucible is recovered and is treated with an aqueous solution of 3.7% hydrochloric acid in an amount of 50 mL of solution per gram of powder. After decantation, the powder is collected by filtration, it is washed with distilled water and it is dried. This same operation is carried out 3 times for 30 minutes.

100 g of a powder of a UMo alloy are thereby obtained, the particles of which are totally cleared of magnesium and of magnesium oxide.

Figure 1:
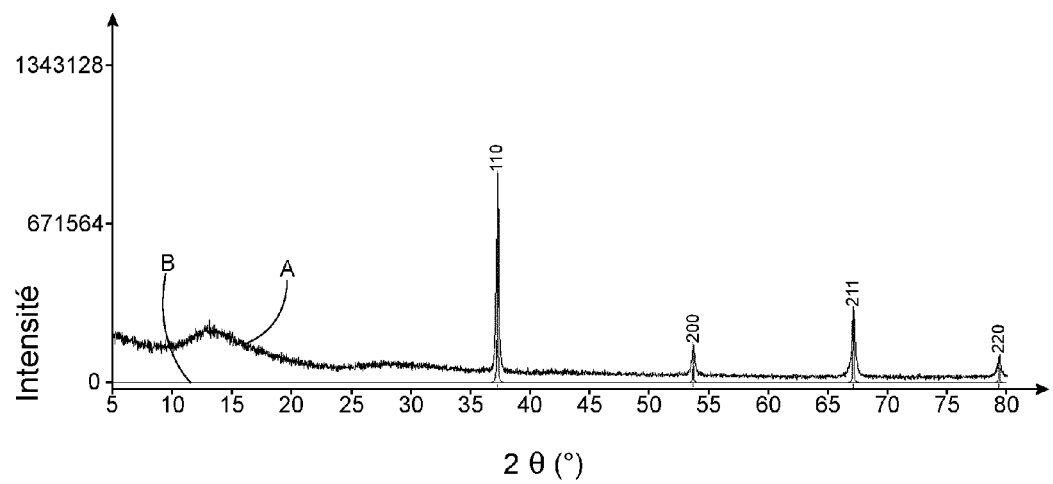
FIG. 1 represents the X-ray diffractogram of a powder of a binary alloy UMo according to the invention (curve A) as well as that of a powder of a reference binary alloy UMo in a metastable γ phase (sheet JCPDS—curve B).
Figure 2:
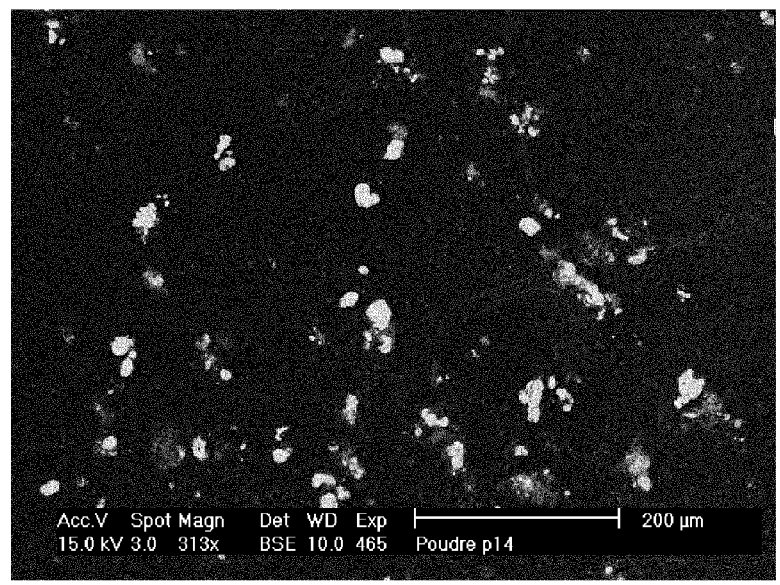
FIG. 2 illustrates a picture taken with a scanning electron microscope, at a magnification of 313, of the powder of the binary alloy UMo according to the invention, the X-ray diffractogram of which is illustrated in FIG. 1, in a polished section.
Figure 3A:
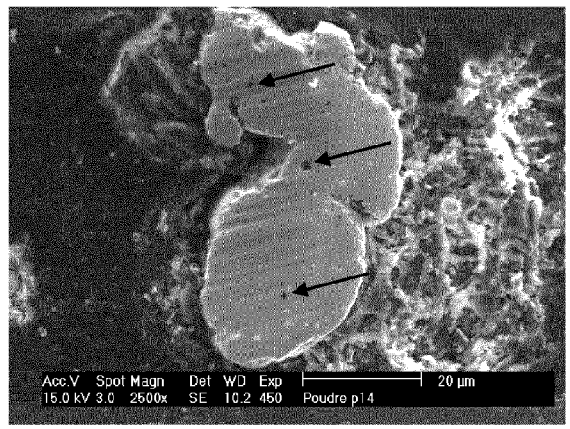
FIGS. 3A, 3B and 3C illustrate pictures taken with a scanning electron microscope, at magnifications of 2,500 (FIG. 3A), 4,000 (FIG. 3B) and 6,322 (FIG. 3C) respectively, of particles of the powder of the binary alloy UMo as shown in FIG. 2 and in which the closed pores which these particles include, are indicated with black arrows.
Figure 3B:
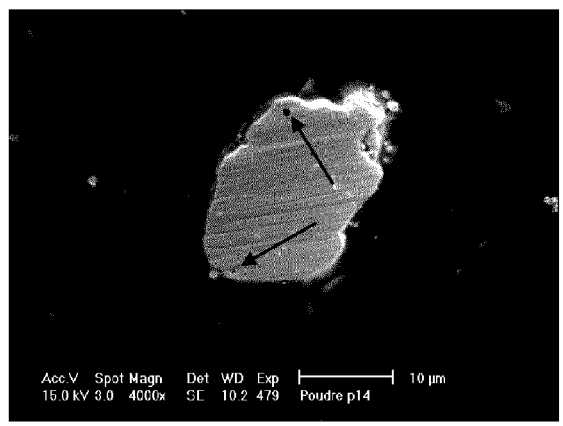
Figure 3C:
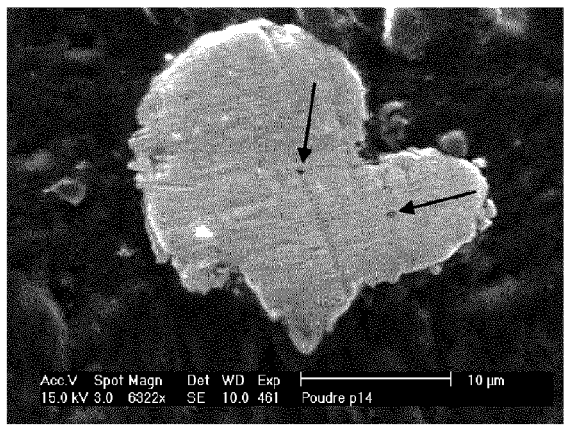

X-ray diffractometry and scanning electron microscopy (SEM) analyses show that this powder is characterized by particles:

in which the alloy is 100% in a cubic centered phase, i.e. in a metastable γ phase, with a parameter of 3.417 Å (cf. the X-ray diffractograms illustrated in FIG. 1);

the dimensions of which are comprised between 20 and 100 µm (cf. FIGS. 2, 3A, 3B and 3C);

which have an elongation index or parameter (as determined from SEM pictures, such as those shown in FIGS. 2, 3A, 3B and 3C, by the methodology described in the aforementioned reference [6]) which is comprised between 1.1 and 2;

which have closed pores, the size of which (i.e. the equivalent diameter as determined from SEM pictures, such as those shown in FIGS. 3A, 3B and 3C, by the methodology described in the aforementioned reference [6]) does not exceed 3 µm; and the closed porosity of which (as determined from SEM pictures, such as those shown in FIGS. 3A, 3B and 3C, according to the ASTM E1245-03 standard) does not represent more than 5% of the total volume of these particles.

Figure 4:
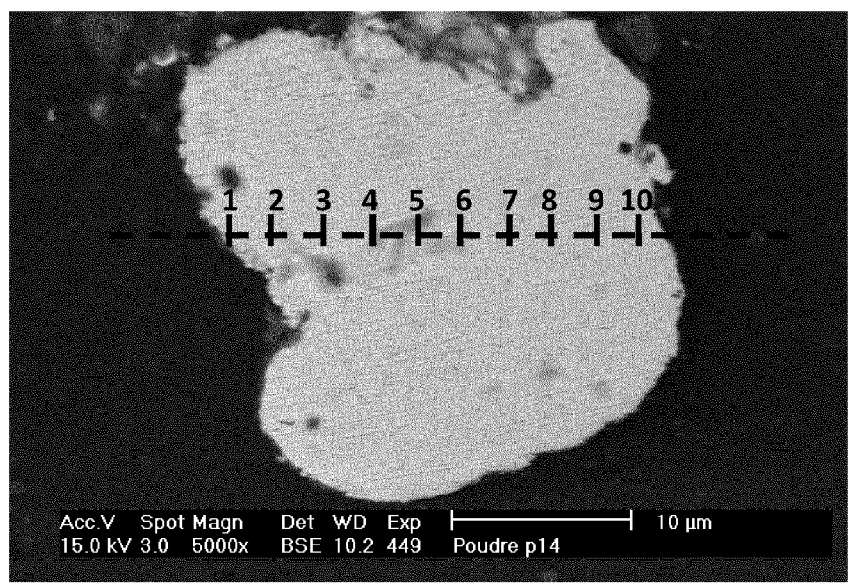
FIG. 4 illustrates a picture taken with a scanning electron microscope at a magnification of 5,000, of a particle of the powder of the UMo binary alloy shown in FIG. 2 and in which are indicated the different marked points (noted from 1 to 10) at which carried out an energy dispersion spectrometry analysis (elementary volume of a marked point: 1 µm$^3$).

Moreover, an analysis of one particle by SEM coupled with energy dispersion spectrometry (EDS) analysis gives for the 10 marked points (noted from 1 to 10—elementary volume of a marked point: 1 µm³) shown in FIG. 4, the uranium and molybdenum mass contents which are shown in Table I hereafter.

TABLE I

| Marked points | U (% by mass) | Mo (% by mass) |
|---|---|---|
| 1 | 86.84 | 13.16 |
| 2 | 86.77 | 13.23 |
| 3 | 86.63 | 13.37 |
| 4 | 87.91 | 12.09 |
| 5 | 87.08 | 12.92 |
| 6 | 86.72 | 13.28 |
| 7 | 86.57 | 13.43 |
| 8 | 87.56 | 12.44 |
| 9 | 87.32 | 12.68 |
| 10 | 86.38 | 13.62 |
| Average ± standard deviation | 86.98 ± 0.48 | 13.02 ± 0.48 |

As shown by this table, the variation of the molybdenum content is less than 1% by mass.

Example 2

Preparation of a Powder of a Ternary Alloy UMoTi According to the Invention 100 g of a powder of a ternary alloy UMoTi are prepared with 9% by mass of molybdenum and 1% by mass of titanium according to the same operating procedure as the one described in Example 1 hereinbefore, except that 9 g of molybdenum and 1 g of titanium are used, the amount of magnesium used being as earlier of about 37 g.

Figure 5:
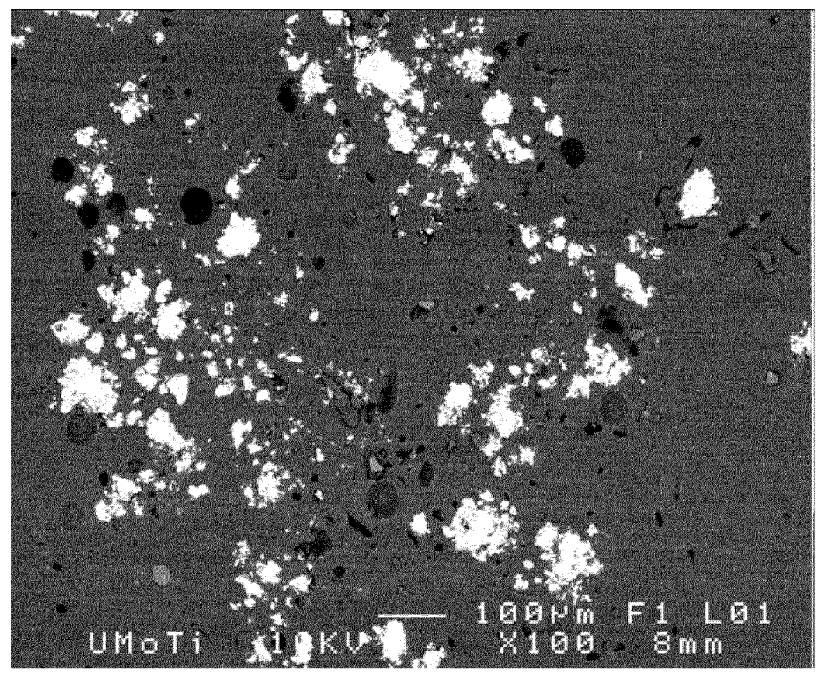
FIG. 5 illustrates a picture taken with a scanning electron microscope, at a magnification of 100, of a powder of a ternary alloy UMoTi according to the invention.

FIG. 5 shows a picture taken with a scanning electron microscope of the thereby obtained UMoTi alloy powder.

Figure 6:
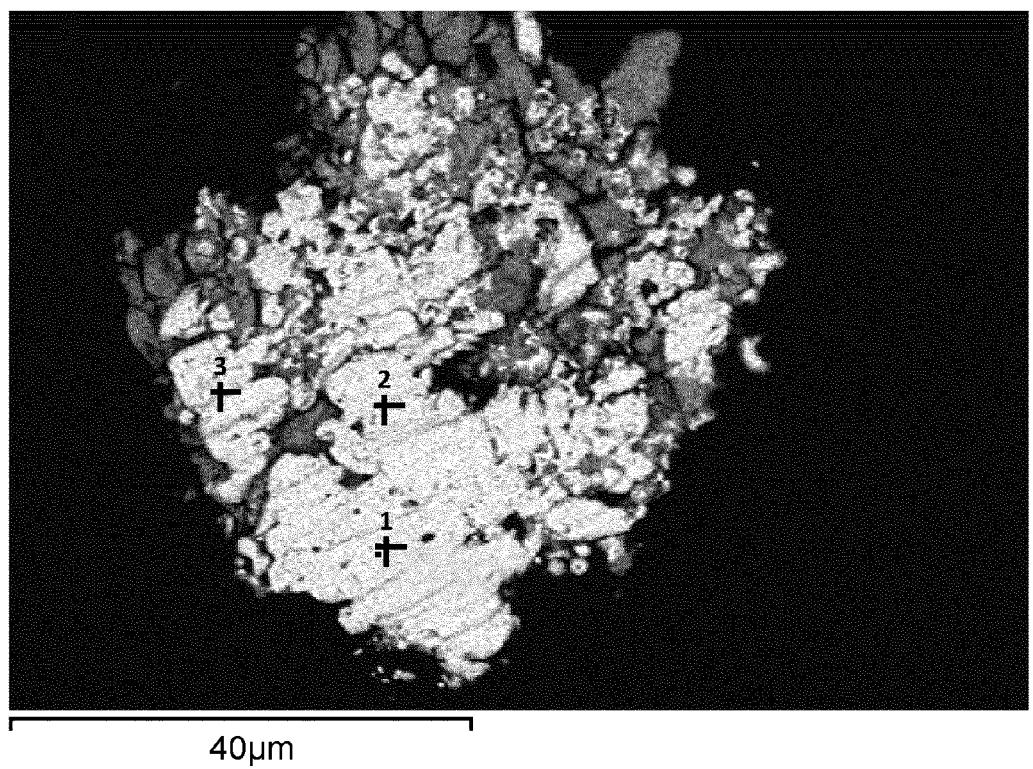
FIG. 6 illustrates a picture taken with a scanning electron microscope, at a magnification of 5,000, of a particle of the powder of the ternary alloy UMoTi shown in FIG. 5 and in which are indicated the different marked points (noted from 1 to 3) at which was carried out an energy dispersion spectrometry analysis (elementary volume of a marked point: 1 µm$^3$).

An analysis of a particle of this powder with SEM coupled with EDS analysis gives, for the 3 marked points (noted from 1 to 3—elementary volume of a marked point: 1 µm³) shown in FIG. 6, the uranium, molybdenum and titanium mass contents are shown in Table II hereafter.

TABLE II

| Marked points | U (% by mass) | Mo (% by mass) | Ti (% by mass) |
|---|---|---|---|
| 1 | 92.4 | 6.24 | 1.72 |
| 2 | 91.95 | 6.10 | 1.95 |
| 3 | 92.16 | 6.07 | 1.77 |
| Average ± std. deviation | 92.05 ± 0.09 | 6.14 ± 0.07 | 1.81 ± 0.10 |

This table shows that not only the distribution of molybdenum is very homogeneous but that of titanium is also very homogeneous.

CITED REFERENCES

[1] FR 2 777 688
[2] U.S. Pat. No. 5,978,432
[3] JP 55-054508
[4] J. S. Lee et al., *Journal of Nuclear Materials*, 306, 147-152, 2002
[5] J. M. Park et al., *Journal of Nuclear Materials*, 397, 27-30, 2010
[6] C. Souchier, <<Analyse d'images>>, in *Techniques de l'Ingénieur, Traité Analyse Chimique et Caractérisation*, P855, 1-18, 1998

The invention claimed is:

1. A powder of an alloy comprising uranium and molybdenum in a metastable γ phase, which is formed of particles which have an elongation index at least equal to 1.1 and at most equal to 2, a closed porosity value higher than 0% and at most equal to 5% by volume, and dimensions ranging from 20 µm to 100 µm, and which are composed of grains having a molybdenum content, the variations of the molybdenum content within a same grain being of at most 1% by mass.

2. The powder of claim 1, wherein the closed porosity of the particles consists of closed pores having a size at most equal to 3 µm.

3. The powder of claim 1, which is a powder of a binary alloy of uranium and molybdenum.

4. The powder of claim 3, wherein the molybdenum content ranges from 5% to 15% by mass.

5. The powder of claim 1, which is a powder of a ternary UMoX alloy wherein X represents a metal other than uranium and molybdenum.

6. The powder of claim 5, wherein X is selected from titanium, zirconium, chromium, silicon, niobium, platinum, tin, bismuth, ruthenium and palladium.

7. The powder of claim 5, wherein the molybdenum content ranges from 5% to 15% by mass, while the X metal content is at most 6% by mass.

8. A nuclear fuel, comprising a powder of an alloy comprising uranium and molybdenum in a metastable γ phase as claimed in claim 1.

9. A target for producing radioisotopes, comprising a powder of an alloy comprising uranium and molybdenum in a metastable γ phase as claimed in claim 1.

10. A method for preparing a powder of an alloy comprising uranium and molybdenum in a metastable γ phase as claimed in claim 1, which comprises:
   a) putting at least one first reagent selected from uranium oxides and mixtures thereof, uranium fluorides and mixtures thereof, into contact with a second reagent consisting of molybdenum and a third reagent consisting of a reducing metal, the first, second and third reagents being in a divided form;
   b) reacting the first, second and third reagents at a temperature at least equal to a melting temperature of the third reagent and under an inert atmosphere, whereby particles are obtained, the particles comprising a core made of the alloy comprising uranium and molybdenum and a layer of an oxide or fluoride of the reducing metal covering the core;
   c) cooling the so obtained particles at a rate at least equal to 450° C./hour; and
   d) removing the layer of oxide or fluoride of the reducing metal from the so cooled particles and thereby obtaining the powder of the alloy comprising uranium and molybdenum.

11. The method of claim 10, wherein the first reagent is a powder of a uranium oxide selected from the group consisting of uranium dioxide, uranium trioxide, uranium sesquioxide, uranium tetraoxide and mixtures thereof.

12. The method of claim 11, wherein the uranium oxide powder is formed of particles having dimensions from 1 μm to 100 μm.

13. The method of claim 11, wherein the uranium oxide powder has a stoichiometric ratio O/U equal to 2 or substantially equal to 2.

14. The method of claim 10, wherein the second reagent is in the form of a powder comprising particles having dimensions of less than 250 μm.

15. The method of claim 10 wherein the third reagent is selected from alkaline metals and alkaline earth metals.

16. The method of claim 15, wherein the third reagent is an alkaline earth metal in a form of a powder, shavings or turnings.

17. The method of claim 16, wherein the third reagent is magnesium or calcium.

18. The method of claim 10, wherein step a) comprises depositing in a reaction enclosure at least one layer of pellets consisting of a homogeneous mixture of the first and second reagents and at least two layers of the third reagent, the layer of pellets being inserted between both layers of the third reagent.

19. The method of claim 10, wherein step b) is carried out at a temperature equal to or greater than 900° C. but lesser than a melting temperature of the alloy comprising uranium and molybdenum.

20. The method of claim 19, wherein step b) is carried out at a temperature from 950° C. to 1,150° C.

21. The method of claim 10, wherein step b) comprises a rise in temperature from 50° C. to 200° C./hour.

22. The method of claim 10, wherein step d) comprises dissolving the layer of oxide or fluoride of the reducing metal.

* * * * *